US010887080B2

(12) United States Patent
Almuhammadi et al.

(10) Patent No.: US 10,887,080 B2
(45) Date of Patent: Jan. 5, 2021

(54) DOUBLE-HASHING OPERATION MODE FOR ENCRYPTION

(71) Applicant: King Fahd University of Petroleum and Minerals, Dhahran (SA)

(72) Inventors: Sultan Ahmad Almuhammadi, Dhahran (SA); Ahmed Amro, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 276 days.

(21) Appl. No.: 15/920,986

(22) Filed: Mar. 14, 2018

(65) Prior Publication Data

US 2018/0270045 A1 Sep. 20, 2018

Related U.S. Application Data

(60) Provisional application No. 62/472,211, filed on Mar. 16, 2017.

(51) Int. Cl.
*H04L 9/00* (2006.01)
*G06F 21/78* (2013.01)
(Continued)

(52) U.S. Cl.
CPC .............. *H04L 9/002* (2013.01); *G06F 21/72* (2013.01); *G06F 21/78* (2013.01); *G09C 1/00* (2013.01);
(Continued)

(58) Field of Classification Search
CPC ..... H04L 9/002; H04L 9/0662; H04L 9/0643; H04L 9/0631; H04L 2209/08;
(Continued)

(56) References Cited

U.S. PATENT DOCUMENTS 8,767,959 B2 7/2014 Relyea et al.
9,374,373 B1 * 6/2016 Chan .................... H04L 9/3247
(Continued)

FOREIGN PATENT DOCUMENTS

EP 0996250 A2 4/2000

OTHER PUBLICATIONS

Alexvandesande, "Standard Writeable Mnemonic Seed Proposal #75" GitHub, Mar. 9, 2016, https://github.com/ethereum/EIPs/issues/75.

(Continued)

*Primary Examiner* — Michael R Vaughan
(74) *Attorney, Agent, or Firm* — Oblon, McClelland, Maier & Neustadt, L.L.P.

(57) ABSTRACT

A method and computer-readable storage medium for a computer system to perform an encryption scheme is disclosed that is capable of encrypting big data that includes complex data, including image data, sensor data, and text data, and supporting both symmetric and asymmetric-key handling. The encryption scheme uses double hashing using two different consecutively-applied hash functions. With double hashing, the encryption scheme eliminates the threat of known cryptanalysis attacks and provides a highly secure ciphering scheme. Also, the ciphertext header generated in the encryption scheme enables efficient cloud data sharing. A user can share the encrypted data later by re-encrypting the seed and sharing a new ciphertext header without the need of re-encrypting the data or changing the secret or private key. Thus, the encrypted data stays as is in the cloud, and only the seed is encrypted and shared as needed.

17 Claims, 8 Drawing Sheets

(51) Int. Cl.

| | |
|---|---|
| ***H04L 9/06*** | (2006.01) |
| ***G09C 1/00*** | (2006.01) |
| ***G06F 21/72*** | (2013.01) |
| *G06F 7/58* | (2006.01) |

(52) U.S. Cl.
CPC .......... *H04L 9/0643* (2013.01); *H04L 9/0662* (2013.01); *G06F 7/582* (2013.01); *H04L 9/0625* (2013.01); *H04L 9/0631* (2013.01); *H04L 2209/08* (2013.01); *H04L 2209/12* (2013.01)

(58) Field of Classification Search
CPC ... H04L 2209/12; H04L 9/0625; G06F 21/72; G06F 21/78; G06F 7/582; G09C 1/00
See application file for complete search history.

(56) References Cited

U.S. PATENT DOCUMENTS

| | | | | |
|---|---|---|---|---|
| 9,832,022 | B1 * | 11/2017 | Pedersen | H04L 9/3236 |
| 2006/0018465 | A1 * | 1/2006 | Saeki | H04N 21/4143 380/44 |
| 2007/0253549 | A1 * | 11/2007 | Celikkan | H04L 9/0637 380/42 |
| 2010/0067686 | A1 | 3/2010 | Minematsu | |
| 2011/0208971 | A1 * | 8/2011 | Bhattacharya | H04L 63/12 713/179 |
| 2012/0207301 | A1 * | 8/2012 | Ramasamy | H04L 9/0637 380/44 |
| 2013/0159698 | A1 * | 6/2013 | Al-Dweik | H04L 9/0875 713/151 |
| 2015/0263858 | A1 * | 9/2015 | Aumasson | H04L 9/14 380/30 |
| 2017/0041135 | A1 | 2/2017 | Greiner et al. | |
| 2017/0300713 | A1 * | 10/2017 | Fan | G06F 21/6227 |

OTHER PUBLICATIONS

Xucjia Lai, et al., "Hash Functions Based on Block Ciphers", Advances in Cryptology—EUROCRYPT '92, LNCS 658, 1993, pp. 55-70.

* cited by examiner

DOUBLE-HASHING OPERATION MODE FOR ENCRYPTION

CROSS-REFERENCE TO RELATED APPLICATIONS

This application claims the benefit of priority to provisional application No. 62/472,211 filed Mar. 16, 2017, the entire contents of which are incorporated herein by reference.

STATEMENT REGARDING PRIOR DISCLOSURE BY THE INVENTORS

Aspects of this technology are described in a conference paper "Double-Hashing Operation Mode for Encryption," 2017 IEEE 7th Annual Computing and Communication Workshop and Conference 9-11 Jan. 2017, incorporated herein by reference in its entirety.

STATEMENT OF ACKNOWLEDGEMENT

The authors would like to thank King Fahd University of Petroleum & Minerals (KFUPM), Dhahran, Saudi Arabia, for supporting this research.

BACKGROUND

Field of the Disclosure

The present disclosure relates generally to an encryption scheme that uses a double hashing function, and in particular an encryption scheme capable of encrypting big data and supporting both symmetric and asymmetric key.

Description of the Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Data sets are growing larger and more complex at an exceedingly rapid rate. Data sets are being managed by massively parallel software running on tens, hundreds, or even thousands of servers, and the amount of data being stored daily is on the order of several exabytes and growing. Data sets are not just getting larger at a faster rate, but also contain a more complex and an increasing variety of data. Data sets not only include text data, but also include image data, video data, audio data, signal data from various sensors, such as acoustic, current, voltage data that are captured at short time intervals, and scientific data, which can take on various formats. Such voluminous and complex data sets are known as big data. Encryption of big data requires improved security with greater performance.

Encryption can be used to protect big data at rest, i.e. data stored on computers and storage devices. Encryption can also be used to protect data in transit, i.e. data being transferred over a network. Any binary data can be encrypted. For example, image data stored on a computer or storage device can be encrypted using the same algorithm that is used to encrypt text, as the image data is comprised of binary data.

Data encryption provides confidentiality as one of the most important goals of data security. A well-known block cipher adopted by NIST in 2001 is the Advanced Encryption Standard (AES). See J. Daemen and V. Rijmen, *The design of Rijndael: AES-the advanced encryption standard*. Springer Science & Business Media, 2013, incorporated herein by reference in its entirety. Since then, AES has been widely used as standard in all file encryption and network protocols. An earlier Data Encryption Standard (DES) has been used since 1977 which suffers many security issues due to its short key size which could not stand the technology advancement. See E. Biham and A. Shamir, *Differential cryptanalysis of the data encryption standard*. Springer Science & Business Media, 2012, incorporated herein by reference in its entirety. Other versions of DES, like 2DES and 3DES, have used to overcome some of the security issues without much of success. See O. P. Verma, R. Agarwal, D. Dafouti, and S. Tyagi, "Performance analysis of data encryption algorithms," in *Electronics Computer Technology (ICECT)*, 2011 3*rd International Conference on*, vol. 5. IEEE, 2011, pp. 399-403, incorporated herein by reference in its entirety. Since its adoption by NIST, AES has replaced all versions of DES in sensitive applications and proved that it is more secure mainly due to its larger block size and key size for almost two decades. Block ciphers, like AES and DES, typically run in some mode of operation. Secure hash functions are cryptographic hash functions that are commonly used in these modes of operation to handle data larger than their limited block sizes. Different modes of operations provide different desired security features. See M. Dworkin, "Recommendation for block cipher modes of operation, methods and techniques," DTIC Document, Tech. Rep., 2001, incorporated herein by reference in its entirety. Recent research shows that the block size of AES can be targeted by several cryptanalysis techniques. See B. Gülmezoğlu. M. S. Inci, G. Irazoqui, T. Eisenbarth, and B. Sunar, "A faster and more realistic flush+ reload attack on aes," in *International Workshop on Constructive Side-Channel Analysis and Secure Design. Springer,* 2015, pp. 111-126; B. Roy, R. P. Giri, C. Ashokkumar, and B. Menezes, "Design and implementation of an espionage network for cache-based side channel attacks on aes," in *Proceedings of the* 12*th International Conference on Security and Cryptography,* 2015, pp. 441-447: and C. Ashokkumar, M. B. S. Venkatesh, R. P. Giri, and B. Menezes, "Design, implementation and performance analysis of highly efficient algorithms for aes key retrieval in access-driven cache-based side channel attacks." 2016, each incorporated herein by reference in their entirety. With today's improving technology and availability of high computational power, more sophisticated attacks on AES become feasible. Therefore, a new encryption algorithm is needed to replace AES in the near future.

Secure hashing was used initially to provide modes of operation with some desired features for block ciphers. See J. Black and P. Rogaway, "A block-cipher mode of operation for parallelizable message authentication," in *International Conference on the Theory and Applications of Cryptographic Techniques*. Springer, 2002, pp. 384-397, incorporated herein by reference in its entirety. In some cryptosystems, hash-functions have been used for encrypting the data directly without block ciphers. See C. W. Kaufman and R. J. Perlman, "Message encryption using a hash function." Jan. 9 1996, U.S. Pat. No. 5,483,598; and T. Bandyopadhyay, B. Bandyopadhyay, and B. Chatterji, "Secure image encryption through key hashing and wavelet transform techniques," *International Journal of emerging technology and Advanced*

*engineering*, vol. 2, pp. 26-31, 2012, each incorporated herein by reference in their entirety. This makes hash-based encryption a good candidate to replace block ciphers. However, hash-based encryption ciphers suffer from vulnerability to some cryptanalysis techniques.

The main difference between block ciphers and stream ciphers is defined by Menezes et al. in Handbook of Applied Cryptography. See A. J. Menezes, P. C. Van Oorschot, and S. A. Vanstone, *Handbook of applied cryptography*. CRC press, 1996, incorporated herein by reference in its entirety. Stream ciphers encrypt individual characters (usually binary digits) of a plaintext one at a time, using an encryption transformation which varies with time. By contrast, block ciphers tend to simultaneously encrypt groups of characters of a plaintext message using a fixed encryption transformation. Similar comparison was mentioned by R. Rueppel. See R. A. Rueppel, "Analysis and design of stream ciphers, communications and control engineering series." *Springer-Verlag Berlin Heidelberg,* 1986, incorporated herein by reference in its entirety. Block ciphers operate with a fixed transformation on large blocks of plaintext data, whereas stream ciphers operate with a time-varying transformation on individual plaintext digits.

Symmetric-key ciphers, like AES, are known for their performance, but it is difficult to achieve secure key negotiation using only symmetric ciphers in network environments where the keys are usually negotiated over insecure channels. Therefore, an asymmetric-key cipher, like Rivest-Shamir-Adleman (RSA), is typically used to send the shared key that is later used in the symmetric key cipher. Hence, a combination of both symmetric and asymmetric ciphers becomes the conventional approach. See S. Vandeven, "Ssl/tls: Whats under the hood," *SANS Institute InfoSec Reading Room*, vol. 13, 2013, incorporated herein by reference in its entirety.

The following describes some of the effective attacks on AES and the security issues of hash functions.

AES Attacks

AES is a strong block cipher of size 128 bits, which doubles the size of its predecessor DES. Since its adoption by NIST in 2001, AES has been a target for cryptanalysis for several years. Two cryptanalysis attacks on AES with improving results are the biclique attack and related-key attacks. With biclique attack a key can be recovered faster than brute-force with computational complexity of $2^{126.1}$, $2^{189.7}$ and $2^{254.4}$ for AES-128, AES-192, and AES-256 respectively. See A. Bogdanov, D. Khovratovich, and C. Rechberger, "Biclique cryptanalysis of the full aes," in *International Conference on the Theory and Application of Cryptology and Information Security*. Springer, 2011, pp. 344-371, incorporated herein by reference in its entirety. While with related-key attacks a key can be recovered with overall time complexity of $2^{131}$ and memory complexity of $2^{65}$. See A. Biryukov, D. Khovratovich, and I. Nikolić, "Distinguisher and related-key attack on the full aes-256," in *Advances in Cryptology-CRYPTO* 2009. Springer, 2009, pp. 231-249, incorporated herein by reference in its entirety.

Other attacks are gaining progress in targeting reduced versions of AES, and more rounds are being attacked each time. An attack mentioned in Dunkelman et al. targeted the 8-Round AES-192, and AES-256 and gained about 1 million times faster attack than exhaustive search with 1/32000 reduced data complexity. See O. Dunkelman, N. Keller, and A. Shamir, "Improved single-key attacks on 8-round aes-192 and aes-256," in *International Conference on the Theory and Application of Cryptology and Information Security*. Springer, 2010, pp. 158-176, incorporated herein by reference in its entirety. The best attack on 9-round AES-256 is proposed in L. Li et al. See L. Li, K. Jia, and X. Wang, "Improved single-key attacks on 9-round aes-192/256," in *International Workshop on Fast Software Encryption*. Springer, 2014, pp. 127-146, incorporated herein by reference in its entirety. Building on the later attack, the first attack on 10-round AES-256 was proposed in R. Li et al. See R. Li and C. Jin, "Meet-in-the-middle attacks on 10-round aes-256." *Designs, Codes and Cryptography*, pp. 1-13, 2015, incorporated herein by reference in its entirety. The authors claimed the attack can be achieved with data complexity of $2^{111}$ chosen plaintexts, $2^{253}$ time complexity, and $2^{11.2}$ AES blocks for memory complexity. The previous three attacks suggest a gradual progress in reaching a successful attack on full AES in the coming years.

Recently a new set of flush-and-reload attacks on AES where proposed in Gülmezoğlu. et al., Roy et al. and Ashokkumar et al. The flush-and-reload attacks basically takes advantage of the resource sharing feature (memory, CPU, etc.) in virtualization environments to capture information leaks from Virtual Machines (VMs) to the host. All these attacks take advantage of the small block size of AES (128 bits). In Gülmezoğlu et al., three attack scenarios were tested, one of them is claimed to recover the entire AES-128 key in only 15 seconds. In Ashokkumar et al. the authors claimed only 6-7 plaintext or ciphertext blocks can lead to the recovery of the entire 128-bit AES key. While in Roy et al., an espionage network is setup to calculate AES keys based on caching information leakage. The authors claimed that their setup can recover the encryption key in less than 30 encryption operations.

A successful power-based side channel attack was conducted in Banerjee et al. See U. Banerjee, L. Ho, and S. Koppula, "Power-based side-channel attack for aes key extraction on the atmega328 microcontroller," 2015, incorporated herein by reference in its entirety. The authors targeted the software implementation of the ATmega328 microcontrollers. The attack basically takes advantage of power related measurements to leak information about ongoing computations on the chip. The attack time complexity is different from one key to another. For example, one key might require the collection of 600 traces for the encryption for a specific plaintext, while another key might require 300 traces. In general, to collect 100 traces it takes 30 minutes and a few more to process.

Hash Functions Security

In Eichlseder et al. the authors targeted the Secure Hash Algorithm 512 (SHA-512) hash function. They implemented and improved a guess-and-determine approach trying to get differential characteristics and colliding message pairs. See M. Eichlseder, F. Mendel, and M. Schläffer, "Branching heuristics in differential collision search with applications to sha-512," in *International Workshop on Fast Software Encryption*. Springer, 2014, pp. 473-488, incorporated herein by reference in its entirety. The improvements enabled the authors to enhance the semi-free-start collision attack on SHA-512 from 24 steps to 38 steps. Despite this improvement on the attack, it is still not efficient to extend it to fully expose SHA-512, due to the increased word size.

Applying hash function iteration to increase security has been used for password-based encryption rather than data encryption. A password-based encryption method is mentioned in Kaliski, where combinations of passwords and salts are used with some iterative count to repeat the process of key generation in a way that makes exhaustive search infeasible. See B. Kaliski, "Pkcs #5: Password-based cryptography specification version 2.0," 2000, incorporated herein by reference in its entirety.

Hash functions have been used as part of newly suggested encryption algorithms. A new chaotic image encryption algorithm is proposed in Gopalakrishnan et al. See T. Gopalakrishnan and S. Ramakrishnan, "Chaotic image encryption with hash keying as key generator," *IETE Journal of Research*, pp. 1-16, 2016, incorporated herein by reference in its entirety. The algorithm implements a hash function (SHA-1) to generate a set of hash keys that are used as initial keys in further operations to provide diffusion and permutation. In Pandian et al., the authors implemented a Toeplitz hash value to generate a pseudorandom key stream for transmitting ECG signals securely in medical applications. See K. Pandian and K. C. Ray, "Dynamic hash key-based stream cipher for secure transmission of real time ecg signal," *Security and Communication Networks*, vol. 9, no. 17, pp. 4391-4402, 2016, incorporated herein by reference in its entirety.

Encryption using a hash function has been possible since the beginning of secure hashing functions. Many of these approaches use a single hash function to generate pseudo-random bits, which can be used as keys for encryption and decryption. In this section, the general framework of single-hash ciphers is explained, and their vulnerability against known cryptanalysis techniques is elaborate on. Some single-hash ciphers are more sophisticated, such as Kaufman et al. and Bandyopadhyay et al. Possible cryptanalysis attacks on these ciphers are shown as well.

Generic Single-Hash Cipher Framework

A hash-based cipher can be built in general with a single hash function. The general framework of a single hash cipher is shown in FIG. 1. The single hash cipher scheme applies a hash function 101 to the main key 111 repeatedly to generate a key stream 103 ($k_1$, $k_2$, . . . $k_n$). The scheme encrypts each segment $p_i$ 105 of the plaintext by XOR-ing it with the key stream segment $k_i$ 103 to generate the corresponding ciphertext segments 107 $c_i = p_i \oplus k_i$, for i=1, . . . , n.

Any hash-based cipher built with a single hash function according to this general framework is vulnerable to known-plaintext attack. Suppose the adversary knows some segment of the plaintext, say $p_j$, then the adversary can compute $k_j = c_j \oplus p_j$ and decipher all the segments after $p_j$ by Algorithm 1. Thus, if the adversary knows the header of the file, $p_1$, then the entire plaintext will be compromised.

Algorithm 1 Known-Plaintext Attack on Generic Single-Hash Ciphers

```
Input: known-plaintext segment (p_j,c_j)
Output: decrypted segments p_{j+1},p_{j+2},...,p_n
k_j ← c_j ⊕ p_j
for i = j + 1 to n do
    k_i ← h(k_{i-1})
    p_i ← c_i ⊕ k_i
end for
```

Message Encryption Algorithm

Single hash ciphers can be more sophisticated and yet can still be attacked. For example, a patent was issued for a message encryption scheme that applies a single-hash function. This approach has two different methods. In the first method, the first part of a message is being encrypted using a key generated by the hash of the concatenation of a secret key and an initialization vector which is not a secret, and the next key will be the hashing of the concatenation of both the previous key and the secret key, and so on. In the second method, the output of the encryption process will be used to generate the next key segment. The following is a discussion of some security issues in this approach and possible attacks.

The encryption algorithm requires a secret key K and an initialization vector IV, which is chosen at random at each time. In the first method of encryption, both K and IV are used to generate a series of keys $k_i$ for i=1, 2, . . . , n where n is the number of plaintext blocks. The first key $k_1$ is calculated using Equation 1.

$$k_1 = \text{hash}(K, IV) \tag{1}$$

While the remaining keys, $k_i$ for i=2, . . . , n, are calculated using Equation 2.

$$k_i = \text{hash}(K, k_{i-1}) \tag{2}$$

Then, each ciphertext block $c_i$ is calculated from a plaintext block $p_i$ using Equation 3, for i=1, 2, . . . , n.

$$c_i = k_i \oplus p_i \tag{3}$$

The message encryption algorithm presented here is clearly more secure than the generic single-hash cipher. Algorithm 1 cannot be directly applied on this scheme since the main key K is used at every step of generating the key stream. Moreover, different initialization victors IV's generate different key streams even if the same key K is used. However, there are two possible vulnerabilities on this scheme.

1) Known-Plaintext Attack:

It is important to observe that IV is sent in clear before the encryption takes place. So, an adversary can notice when the same IV is repeated. If the adversary has access to a known pair of plaintext/ciphertext, the key streams ($k_1$, $k_2$, . . . ) can be calculated using Equation 4.

$$k_i = c_i \oplus p_i \tag{4}$$

Later if the adversary intercepts a ciphertext that is known to be encrypted using the same secret key K and the same IV, the plaintext can be obtained using Equation 5, for i=1, 2, . . . , n.

$$p_i = c_i \oplus k_i \tag{5}$$

Notice that the IV is being chosen at random. So, unless the period of the random generator is large enough to make any repetition for both the key and the IV together highly unlikely, the previous attack is feasible. For example, in a high speed network where each message is encrypted alone, if the random generator produces 32-bit IV's, some of them will repeat in less than few seconds according to the birthday problem, which makes the scheme vulnerable to known-plaintext attack.

2) Chosen-Ciphertext Attack:

The first key segment is the output of hashing K concatenated with IV. The first block of the plaintext is calculated by XOR-ing the hash output with the first block of the ciphertext. If an attacker has access to the decryption device, he can feed it with a null ciphertext (a binary value with all zeros) and a null IV (empty string). When this null ciphertext is decrypted, the first block of the output would be the hash of the secret key $k_1$=hash(K). This information by itself does not mean that the cryptosystem is broken, but it gives the attacker some useful information about the key. Thus, if the hash function is not secure, the attacker can recover the key. The patent for this scheme was issued in 1996 and it recommended the use of the Message-Digest (MD4) hash function which is not secure anymore. See X. Wang, X. Lai, D. Feng, H. Chen, and X. Yu, "Cryptanalysis of the hash functions md4 and ripemd," in *Annual International Conference on the Theory and Applications of Cryptographic*

*Techniques*. Springer, 2005, pp. 1-18; and H. Dobbertin, "Cryptanalysis of md4." *Journal of Cryptology*, vol. 11, no. 4, pp. 253-271, 1998, each incorporated herein by reference in their entirety.

Image Encryption Algorithm

Another example is presented of a relatively new single-hash cipher is the image encryption algorithm. In this cipher, a secret key is hashed into a corresponding SHA1 hash value and converted to a binary form. Then the wavelet transform for the image is calculated and converted into binary string too. The key is expanded to fit the size of the image and XOR-ed bit-wise with the image string to create the encrypted image.

There is a weakness in this scheme that makes it vulnerable to known-plaintext attack. The encryption algorithm takes a secret key K and a plain image P as input and generates an encrypted image C as an output. The secret key K will be hashed using SHA1 hash function. The output of the hash will then be expanded to match the size of the plain image. It may be assumed that some expansion function $F_{exp}$ is used, and the result of $F_{exp}$ is the encryption key $K_{enc}$ as shown in Equation 6.

$$K_{enc}=F_{exp}(SHA1(K)) \tag{6}$$

The plain image P will be XOR-ed with the encryption key $K_{enc}$ to produce the encrypted image C using Equation 7.

$$C=P\oplus K_{enc} \tag{7}$$

Using known-plaintext attack, a similar method to Algorithm 1 can be applied to compute the encrypted key $K_{enc}$ and recover the original image. Suppose an adversary has a known pair of the image $P_0$ and the encrypted image $C_0$, he can calculate the encryption key $K_{enc}$ using Equation 8, which will always be the same for the same secret key K.

$$K_{enc}=P_0\oplus C_0 \tag{8}$$

Later if the adversary intercepts an encrypted image C that is known to be encrypted using the same secret key K. The original image can be obtained using Equation 9.

$$P=K_{enc}\oplus C \tag{9}$$

This attack is highly likely to occur since the shared secret key K is not periodically changing, which implies it always generates the same encryption key $K_{enc}$. Using this attack, the adversary can record all transactions between two communicating entities, and upon acquiring a pair of plain/encrypted images, all other encrypted images can be easily decrypted without even knowing the secret key.

Given the potential attacks on AES described above, and the cryptanalysis of single-hash ciphers explained above, there is a growing need for a more secure encryption algorithm. Accordingly it is an object of the present disclosure to provide an encryption scheme that uses a double hashing function capable of encrypting big data and supporting both symmetric and asymmetric key with improved resistance to cryptanalysis.

BRIEF SUMMARY OF THE INVENTION

According to a first aspect, the present disclosure relates to a method, performed by circuitry in a computer system, of encrypting complex data into ciphertext, where the complex data includes image data and text data stored in one or more files in at least one memory device. The method involves generating a random integer to obtain a seed; encrypting the seed using a seed key and storing the encrypted seed in a header; hashing the seed using a first hash function to obtain a pseudorandom value; hashing the pseudorandom value using a second hash function to obtain a key stream: encrypting the complex data using the key stream to obtain the ciphertext; and storing in a file in the at least one memory device the ciphertext with the header.

In one embodiment, the complex data is binary data that is divided into n segments, the hashing using the first hash function includes repeatedly hashing, by the circuitry, to obtain a sequence of n pseudorandom values, the hashing using the second hash function includes hashing, by the circuitry, the pseudorandom values using the second hash function to obtain the key stream.

In one embodiment, the encrypting the complex data includes encrypting, by the circuitry, the complex data by applying an XOR function with the key stream to obtain the ciphertext.

In one embodiment, the seed is at least 512 bits.

In one embodiment, the first hash function is a cryptographic hash function that generates a hash of a different number of bits than the second hash function.

In one embodiment, the complex data includes signal data from sensors.

According to a second aspect, the present disclosure relates to non-transitory computer-readable storage medium storing instructions, wherein when the instructions are performed by circuitry in a computer system, the circuitry encrypts complex data, including image data and text data stored in at least one file in at least one memory device, into ciphertext by steps involving generating a random integer to obtain a seed: encrypting the seed using a seed key and storing the encrypted seed in a header: hashing the seed using a first hash function to obtain a pseudorandom value; hashing the pseudorandom value using a second hash function to obtain a key stream; encrypting the complex data using the key stream to obtain the ciphertext; and storing in a file in the at least one memory device the ciphertext with the header.

In one embodiment, the complex data is binary data that is divided into n segments, the hashing using the first hash function, by the circuitry, includes repeatedly hashing to obtain a sequence of n pseudorandom values, and the hashing using the second hash function, by the circuitry, includes hashing the pseudorandom values using the second hash function to obtain the key stream.

In one embodiment, the encrypting the complex data includes encrypting, by the circuitry, the complex data by applying an XOR function with the key stream to obtain the ciphertext.

In one embodiment, the seed is at least 512 bits.

In one embodiment, the seed key is a shared secret key.

In one embodiment, the seed key is a public key and a secret key is used for decrypting the header.

In one embodiment, the first hash function is a cryptographic hash function that generates a hash of a different number of bits than the second hash function.

In one embodiment, the complex data includes signal data from sensors.

According to a third aspect, the present disclosure relates to a method, performed by circuitry in a computer system, of encrypting complex data into ciphertext, where the data includes image data and text data stored in at least one buffer memory device. The method involves generating a random integer to obtain a seed: encrypting the seed using a seed key and storing the encrypted seed in a header; hashing the seed using a first hash function to obtain a pseudorandom value; hashing the pseudorandom value using a second hash function to obtain a key stream; encrypting the complex data using the key stream to obtain the ciphertext; and transmitting the ciphertext with the header.

In one embodiment, the complex data is binary data that is divided into n segments, the hashing using the first hash function includes repeatedly hashing, by the circuitry, to obtain a sequence of n pseudorandom values, and the hashing using the second hash function includes hashing, by the circuitry, the pseudorandom values using the second hash function to obtain the key stream.

In one embodiment, the encrypting the complex data includes encrypting, by the circuitry, the complex data by applying an XOR function with the key stream to obtain the ciphertext.

In one embodiment, the seed key is a shared secret key that is used for decrypting the header.

In one embodiment, the seed key is a public key and a secret key is used for decrypting the header.

In one embodiment, the complex data includes signal data from sensors.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION

Figure 1:
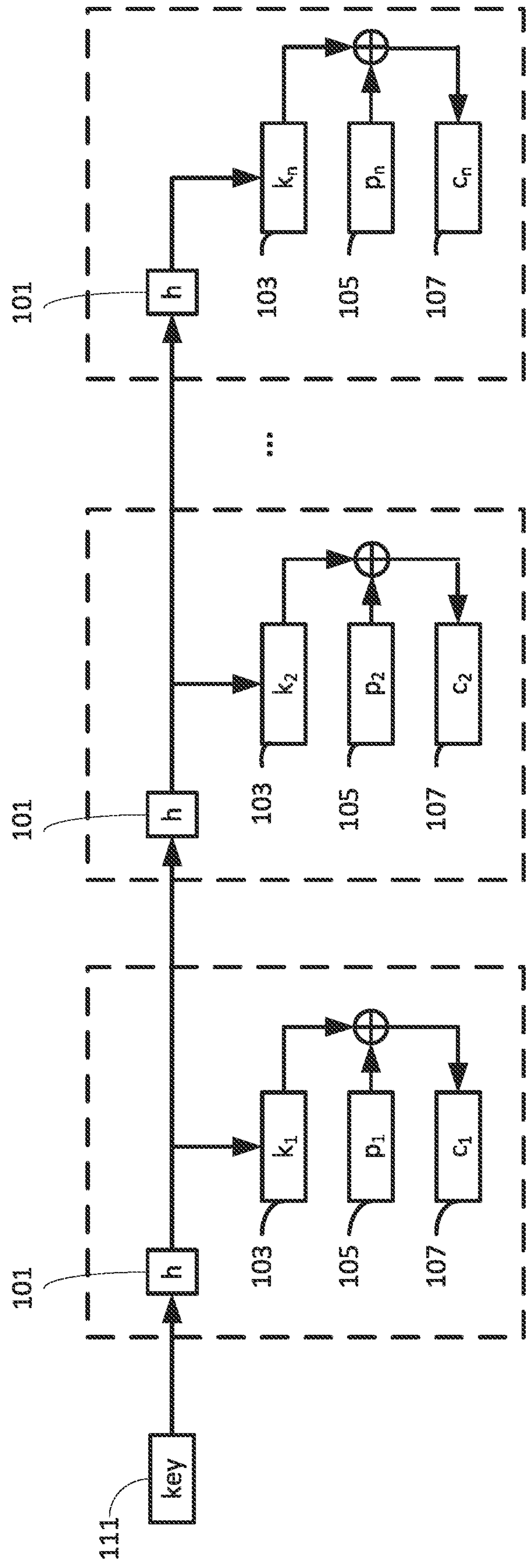
FIG. 1 illustrates a General Single-Hash Cipher framework.

Embodiments of the present disclosure will now be described more fully hereinafter with reference to the accompanying drawings, in which some, but not all embodiments of the disclosure are shown.

All publications mentioned herein are incorporated herein by reference in full for the purpose of describing and disclosing the methodologies, which are described in the publications, which might be used in connection with the description herein. The publications discussed above and throughout the text are provided solely for their disclosure prior to the filing date of the present application. Nothing herein is to be construed as an admission that the inventors are not entitled to antedate such disclosure by virtue of prior disclosure. Also, the use of "or" means "and/or" unless stated otherwise. Similarly, "comprise," "comprises," "comprising" "include," "includes," and "including" are interchangeable and not intended to be limiting. As used herein, the words "a" and "an" and the like carry the meaning of "one or more."

The present disclosure will be better understood with reference to the following definitions.

As used herein, "plaintext" refers to any binary data, including text data, image data, video data, audio data, signal data from various sensors, such as acoustic, current, voltage data that are captured at short time intervals, and scientific data, which can take on various formats.

As used herein, "big data" refers to voluminous and complex data sets that relational database management systems have difficulty handling, due to factors including growth in amount of data in data sets on the order of several exabytes and greater, database systems that require hundreds or more servers, and data sets from various sources and of various types such as from cameras, sensors, signals from devices such as wireless devices, meteorological data, genomics data, and other scientific data.

As used herein, "data at rest" refers to encryption applied to data stored on computers and storage devices. As used herein, "data in transit" refers to encryption applied to data being transferred over a network.

As used herein, "cloud" refers to a service-oriented architecture that is accessible over the Internet. Among the services provided in the cloud are a distributed database system and file management system.

Referring now to the drawings, wherein like reference numerals designate identical or corresponding parts throughout several views, the following description relates an encryption scheme, which may be referred to as DHOME, which stands for Double-Hashing Operation Mode for Encryption. The disclosed encryption scheme is more secure than other hash-based ciphers, and with a built-in mode of operation. Unlike many of the existing hash-based encryption schemes, the disclosed scheme uses two secure consecutively-applied hashing functions to generate a pseudorandom sequence of bits that can be used as a key to encrypt the plaintext P in a simple XOR operation. By consecutively applying double hashing, more confusion can be created and diffusion ensures the security of the disclosed scheme. Moreover, as will be discussed later, the encryption scheme can be used with symmetric or asymmetric-keys.

In one or more embodiments, it is assumed the plaintext is given in some input file and the ciphertext is generated and saved in an output file. However, the disclosed encryption scheme is not limited to this assumption. For example, these input and output files can be replaced by any two parties, like sender and receiver in network communication. In the case of transmission of plaintext between two parties, the plaintext may be stored for processing and the ciphertext may be stored for transmission in one or more buffer memory devices.

The disclosed encryption scheme has features that make it particularly useful for encrypting complex data stored in a distributed database system such as in the cloud. However, the exceptional security features of the disclosed encryption scheme make it applicable to any stored (e.g., data at rest) or transmitted (e.g., data in transit) data that requires security measures.

The disclosed encryption scheme may be performed in a computer system having processing circuitry, as will be described in more detail below. The computer system preferably has an operating system that supports file management in a networked computing environment. The disclosed encryption scheme may be a program of instructions that are executed in the cloud and may be used to encrypt complex data maintained in the cloud. The disclosed encryption scheme may be performed by circuitry to encrypt complex data to be transmitted to or from a computer system.

Figure 2:
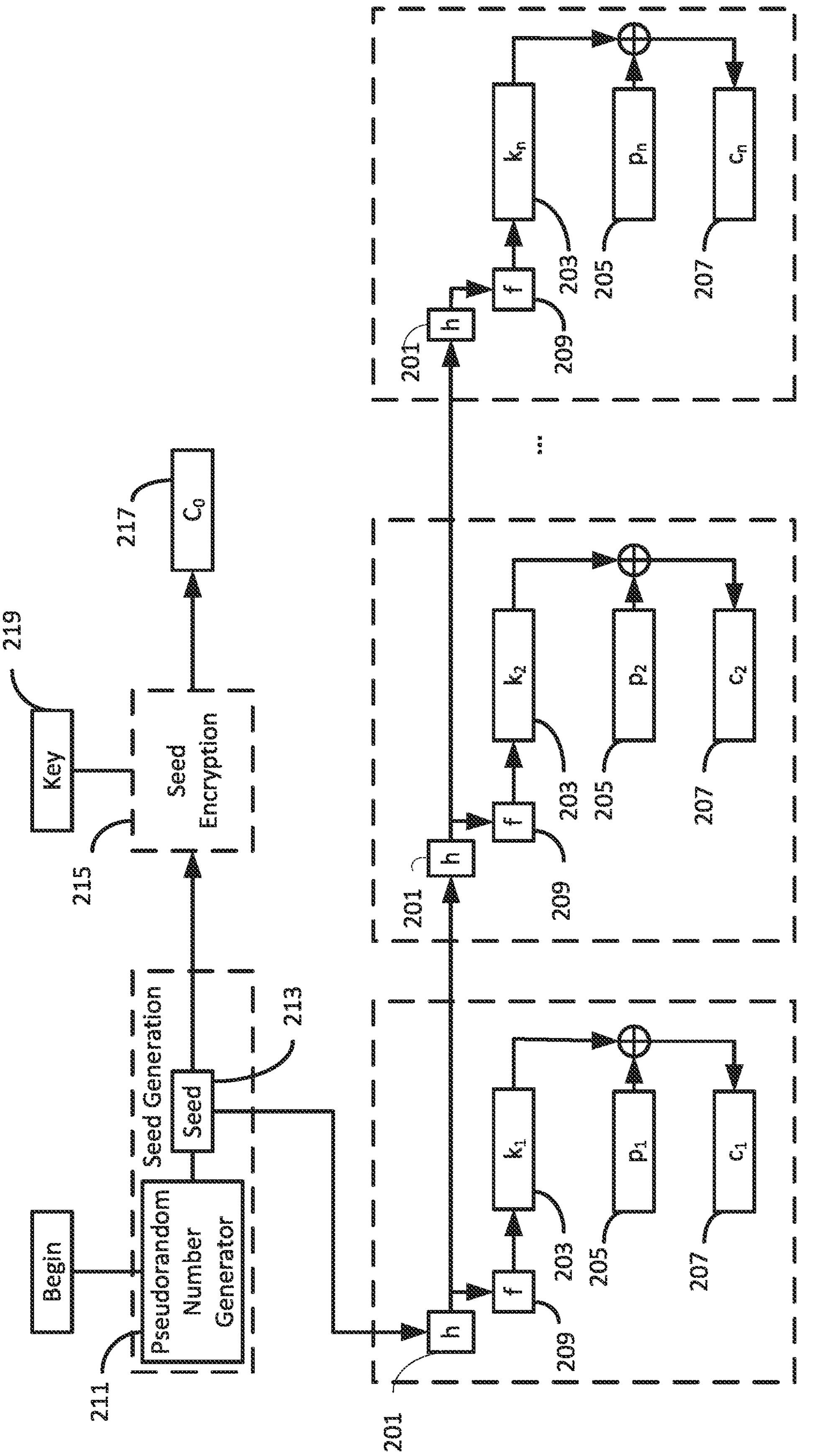
FIG. 2 illustrates a block diagram of DHOME according to an exemplary aspect of the disclosure.

FIG. 2 shows the block diagram of the disclosed encryption scheme. The disclosed encryption scheme involves the execution of two different hash functions, h and $f$. The plaintext is processed in segments, $P=p_1, p_2, \ldots, p_n$, each of length equal to the hash value length of hash function $f$. The ciphertext is also computed in segments, $C=c_1, c_2, \ldots, c_n$, where each segment $c_i$ of the ciphertext is corresponding to one segment of the plaintext $p_i$, plus an additional header of the ciphertext $c_0$. In an exemplary aspect, the two different hash functions, h and $f$, are cryptographic hash functions such as those in the SHA-2 family of standards. In examples described below, the hash functions h and $f$ are SHA-384 and SHA-512, respectively. Other hash functions that may be used include MD4, MD5, MD6 and the SHA 3 family of standards. In an exemplary aspect, each plaintext/ciphertext segment is 512 bits. The last segment $p_n$ can have less than 512 bits without padding and it is XOR-ed with same number of bits of the key segment $k_n$. The rest of $k_n$ can be truncated. In an alternative aspect, the plaintext block size may be 1024 bits.

A difference between the disclosed encryption scheme and the method of applying hash function iteration in Kaliski is that in the disclosed encryption scheme a combination of two different hash functions is used without repetition to defy known-plaintext attacks rather than iterating the same hash function to increase the secrecy of a password.

Encryption Scheme

In one or more embodiments, the disclosed encryption scheme may be performed by circuitry in the computer system as follows. First, in 211, a pseudorandom number generator generates a sufficiently large random integer seed 213, for example of at least 512 bits. In 215, the computer system encrypts the seed 213 using a seed key 219 and stores the encrypted seed in the header $C_0$ 217, which may be contained in a temporary memory device such as a cache memory. The seed 213 may be encrypted using the Advanced Encryption Standard (AES), or a comparable algorithm, in the case of symmetric mode. In the case of asymmetric mode, the seed 213 may be encrypted using RSA, or a comparable algorithm.

Then, the circuitry hashes the seed 213 by executing a secure hash function h and, in 201, the output of the hash function, $h_1$=h(seed), is hashed repeatedly to generate a sequence of n pseudorandom values $H=h_1, h_2, \ldots, h_n$, where $h_i=h(h_i-1)$, and n is the number of the plaintext/ciphertext segments. This sequence is used to generate the key stream $K=k_1, k_2, \ldots, k_n$ 203.

To resist known-plaintext and chosen-ciphertext attacks, the relation between the key stream K 203 and the pseudorandom values H are hidden. In the disclosed encryption scheme, the relation between key stream K and values H are hidden by performing double-hashing using two different hash functions. Thus, the circuitry performs a second secure hash function $f$ 209 on the pseudorandom values H to obtain the key stream 203, i.e. $k_i=f(h_i)$ for i=1, 2, . . . , n. The circuitry uses the key stream K 203 to encrypt the plaintext 205 by XOR operation. So, each segment of the resultant ciphertext 207 is computed by $c_i=p_i \oplus k_i$.

Symmetric and Asymmetric-Key Options

Figure 3:
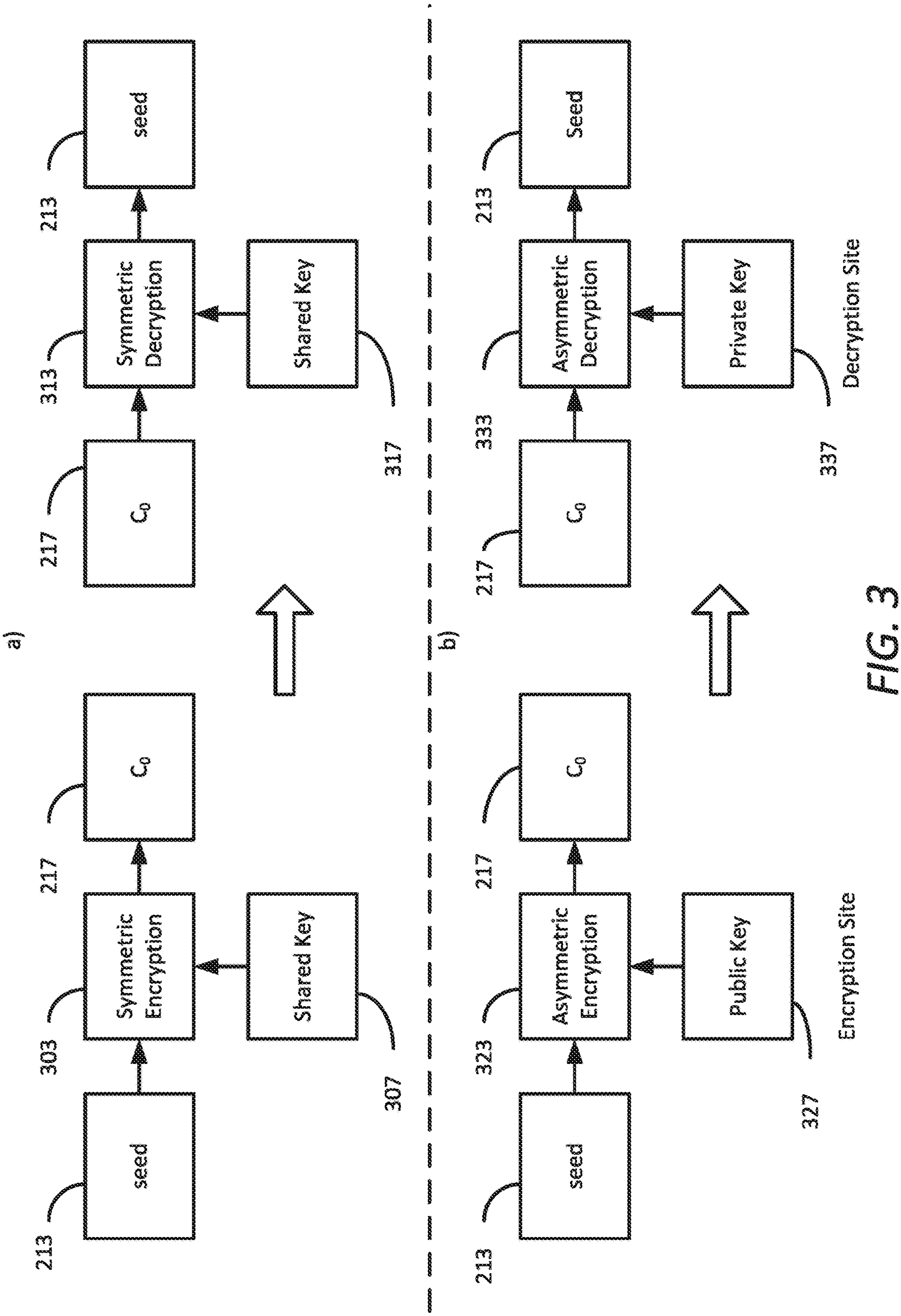
FIG. 3 is a flowchart illustrating seed encryption modes according to an exemplary aspect of the disclosure.

Messages may be sent by a sender device to a recipient device using the disclosed encryption scheme. The disclosed encryption scheme can accommodate either symmetric key cryptography or asymmetric key cryptography: (a) Symmetric-key Mode, and (b) Asymmetric-key Mode, as shown in FIG. 3. In the Symmetric Mode, the disclosed encryption scheme can be used as a symmetric-key cipher by applying the shared symmetric secret key 307 with any secure symmetric cipher at both sides (sender 303 and receiver 313). While in the Asymmetric Mode, the disclosed encryption scheme can be used as asymmetric-key cipher by applying two different keys (public 327 and private 337) on any secure asymmetric-key cipher 323, 333.

In an exemplary aspect, the symmetric and asymmetric ciphers are only used in the disclosed encryption scheme to encrypt/decrypt the seed 213, not the data P itself. Therefore, the high cost associated with the asymmetric cipher and the overhead associated with the mode of the operation of the symmetric cipher do not affect the cost and the performance of the disclosed encryption scheme.

Moreover, only the ciphertext $C_0$ 217 needs to be replaced for the disclosed encryption scheme to be changed from using Symmetric Mode to encrypt big data, to later using the Asymmetric Mode. The sender can encrypt the seed 213 using the public key 327 of the receiver and send the new header $C_0$ 217 with the same ciphertext C, without re-encrypting the whole data.

Figure 4:
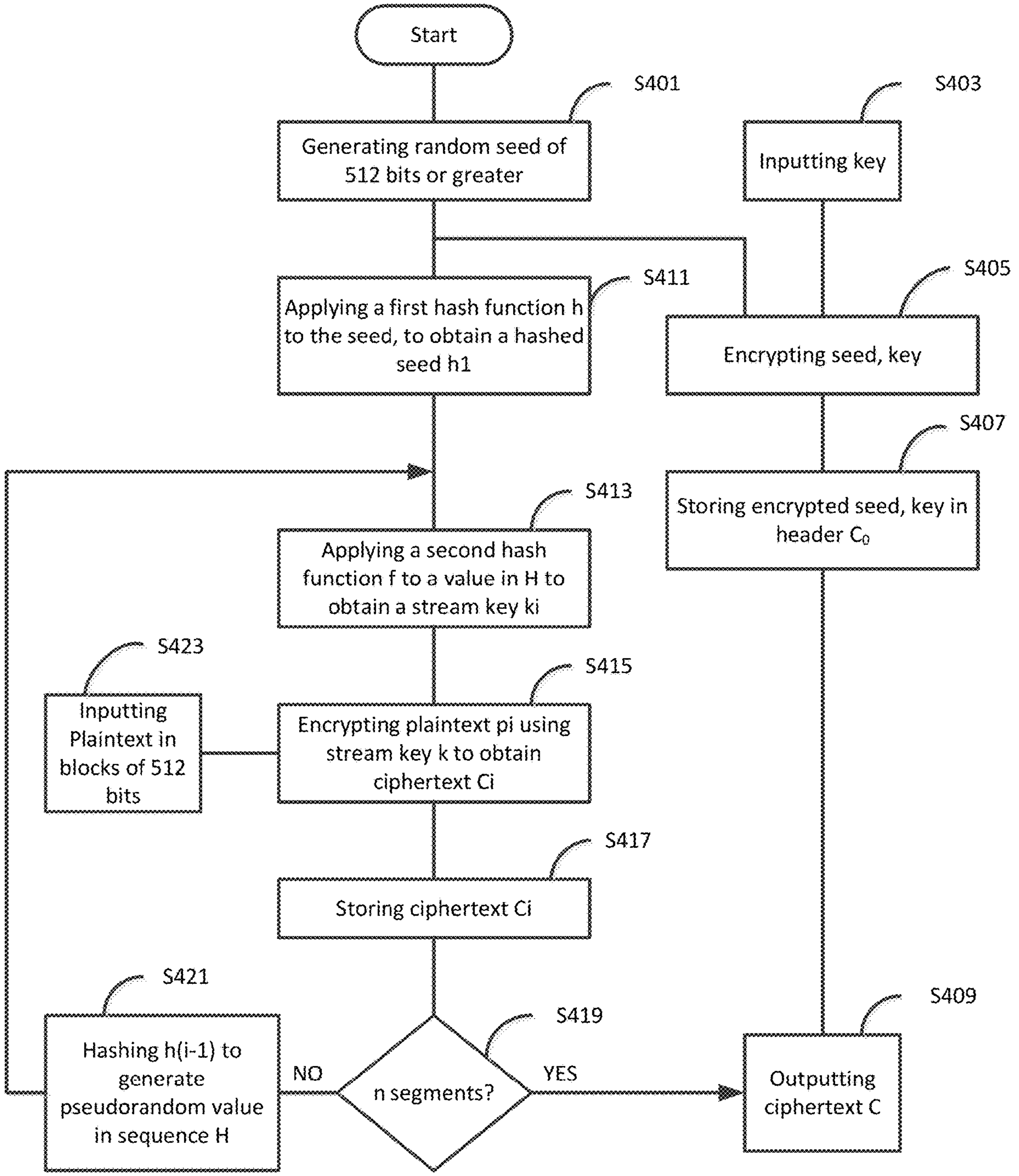
FIG. 4 is a flowchart illustrating the encryption scheme according to an exemplary aspect of the disclosure.

FIG. 4 is a flowchart illustrating the steps of the encryption scheme according to an exemplary aspect of the disclosure. The flowchart highlights the aspect that the seed is encrypted with a key and stored in a ciphertext header, while the plaintext is encrypted to provide the remaining ciphertext based on the seed. In an exemplary aspect, the plaintext may be complex data stored in a distributed database system as big data and the ciphertext is stored as the encrypted complex data. In an alternative exemplary aspect, the plaintext is a message that is to be securely transmitted to a recipient. The plaintext is encrypted using the disclosed encryption scheme and the output ciphertext C is transmitted. In either case, in step S401 a pseudorandom number generator generates the seed. The seed may be long, such as 512 bits or longer. In S411, the random seed is hashed using a first secure hash function h to obtain a hashed seed h1. The random seed is also encrypted using the seed key in S403 and S405. The encrypted seed is temporarily stored in a memory as a header for the ciphertext $C_0$ in S407. In S423, segments of plaintext are input in blocks of 512 bits. The hashed seed is hashed repeatedly to generate a sequence of n pseudorandom hash values H where $h_i=h(h_i-1)$ and n is the number of the plaintext/ciphertext segments. In particular, in S413 a second secure hash function f is applied to the previous hash $h_i-1$ to obtain a stream key ki. In S415, the plaintext segment is encrypted using the stream key ki to obtain ciphertext ci. The ciphertext ci is temporarily stored in a memory in S417. Based on decision S419, the hashing. S421. S413, and encrypting S415 steps are repeated for each plaintext segment. When all plaintext segments have been encrypted (YES in S419), the ciphertext C, including the header c0 and ciphertext blocks for the plaintext segments, is output in S409. In some embodiments, the outputted ciphertext C is stored in a file. In some embodiments, the outputted ciphertext C is transmitted to a recipient device.

Security Analysis

The security of the disclosed encryption scheme can be characterized by features that enable the disclosed scheme to withstand the cryptanalysis attacks that single-hash ciphers are vulnerable to, namely: known-plaintext and chosen-ciphertext attacks. The following describes how the disclosed encryption scheme is highly secure against these attacks. The disclosed encryption scheme may also be referred to as Double-Hashing Operation Mode for Encryption (DHOME).

1) Known-Plaintext Attack Proof:

In known-plaintext attacks, the adversary has access to a pair of plaintext/ciphertext and wants to either compute the key or decipher another ciphertext. What makes the disclosed encryption scheme resilient against such attack is the application of double-hashing. Unlike single-hash ciphers, the disclosed scheme uses two hash functions. Therefore, if an adversary has access to a known plaintext segment ($p_i$, $c_i$), only the corresponding key segment $k_i$ is compromised by Equation 4. The adversary cannot compute any other key segment $k_j$ for j≠i since this requires "unhashing" of $f$ to compute $h_i = f^{-1}(k_i)$, which is equivalent to breaking SHA-512.

Moreover, suppose the adversary has access to a whole plaintext/ciphertext pair (P. C). Even though the whole key stream will be compromised by Equation 4, both the main key and the seed remain secure. The key stream is just a random sequence of bits that is used to compute C from P, or P from C, nothing more. This helps to avoid the security issue that exists in Bandyopadhyay et al. Even if the main key is not changed, each encryption process has a unique key stream due to the application of a large random seed at the beginning of each encryption process. Therefore, the subsequent hashes initiated with the random seed will produce a different key stream every time. Also, to avoid the possibility of repeating the same key with the same value of the seed, it is preferable to implement a random generator that outputs an output size 512-bit or more. This requirement was not mentioned in Kaufman et al.

2) Chosen-Ciphertext Attack Proof:

In chosen-ciphertext attacks, an adversary has access to the decryption device without knowledge of the embedded key. So the adversary can apply the decryption algorithm on some input ciphertext of his choice and recover the output plaintext in the hope of exposing the key. Unlike the message encryption scheme mentioned in Kaufman et al., this attack has no effect against the disclosed encryption scheme since the embedded key will only be used to decrypt the seed. The key has no effect on the output plaintext. Also, the value of the seed cannot be derived from the plaintext due to the application of not one, but two secure hash functions.

Sensitivity Testing

The security aspects of a group of known hash functions were evaluated using sensitivity tests. The targeted hash functions are: SHA-512, SHA-384, SHA-256, MD5 and MD4. The randomness of a hash function output is a key measurement of its security. To acquire accurate measurements of the randomness of each targeted hash function, an intensive sensitivity test was conducted. The idea here is to see how many output bits may change if a single input bit is changed. Each hash function was tested using the sensitivity test shown in Algorithm 3.

To test a hash function h of output length κ bits, the algorithm generates r random strings of length κ. For each random string w, the hash value $h_w$ is computed. Then a single bit in w is flipped, and a new hash value $h_{\hat{w}}$ is computed. These two hash values are compared to each other and the percentage of their Hamming distance to their length is recorded in the sensitivity matrix. The location of the flipped bit varies from 1 to κ for each tested hash function. The algorithm computes and returns the sensitivity matrix, where Sensitivity[i, j] indicates the percentage of the change in the output of hashing the $j^{th}$ random string when a single input bit at location i is flipped. The ideal sensitivity score is 50%.

Algorithm 3 Sensitivity Test

```
Input: hash output length (bits) k
       number of random strings r
Output: sensitivity matrix Sensitivity[k,r]
for i = 1 to k do
    for j = 1 to r do
        w ← random_string(k)
        h_w ← h(w)
        ŵ ← bit_flip(w,i)
        h_ŵ ← h(w)
        δ ← Hamming_distance(h_w,h_ŵ)
        Sensitivity[i,j] ← (δ/k) × 100
    end for
end for
```

Figure 5:
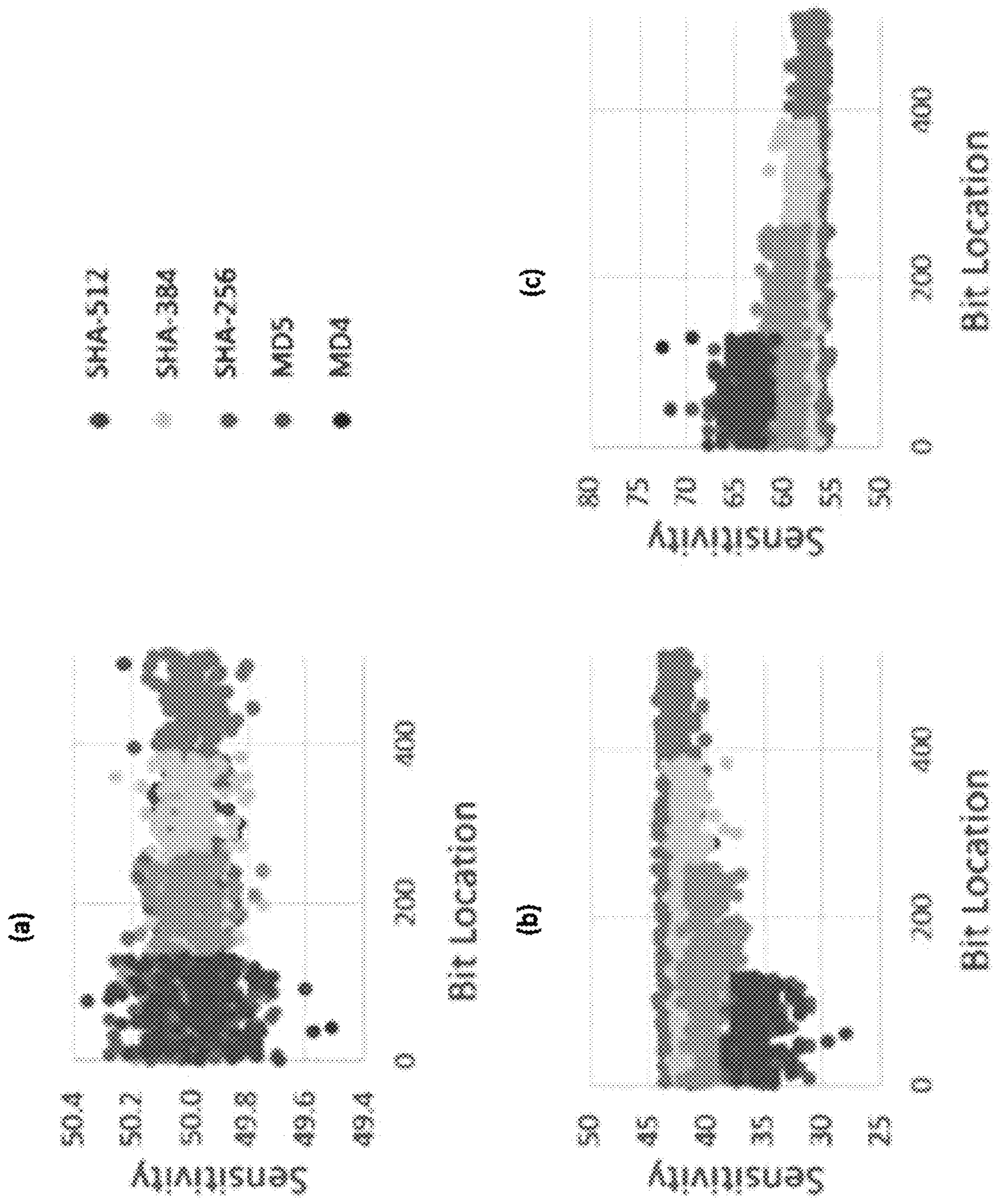
FIG. 5 illustrates the results of Hash Functions Sensitivity Scores (a) Average (b) Minimum (c) Maximum.

In the sensitivity test, the algorithm is performed for r=100 random strings and the minimum, maximum and average sensitivity values for each bit location and for all the five hash functions are calculated. The results of all the five tests are shown in FIG. 5. Each point (x, y) in (a) of FIG. 5 represents the average sensitivity score y of the bit at location x computed by Equation 10. While the points in (b) and (c) in FIG. 5 represent the minimum and the maximum scores computed by Equations 11 and 12 respectively.

$$y = \sum_{j=1}^{r} \text{Sensitivity}[x, j]/r \tag{10}$$

$$y = \min_{\forall j}(\text{Sensitivity}[x, j]) \tag{11}$$

$$y = \max_{\forall j}(\text{Sensitivity}[x, j]) \tag{12}$$

Table I summarizes the sensitivity test results numerically. It shows the output length, the average, the minimum, and the maximum score ranges of all the five hash functions.

TABLE I

NUMERICAL RESULTS OF THE SENSITIVITY TESTS

| Function | κ (bits) | Average (%) | Minimum (%) | Maximum (%) |
|---|---|---|---|---|
| SHA-512 | 512 | 49.79-50.23 | 39.65-44.34 | 55.47-60.35 |
| SHA-384 | 384 | 49.75-50.26 | 37.50-43.75 | 56.51-61.72 |
| SHA-256 | 256 | 49.74-50.24 | 36.72-42.19 | 57.81-62.89 |
| MD5 | 128 | 49.71-50.28 | 31.25-38.28 | 61.72-69.53 |
| MD4 | 128 | 49.51-50.36 | 28.13-38.28 | 60.94-72.66 |

It can be seen in (a) of FIG. 5 and the average column in Table I that all the hash functions provide good average sensitivity scores since all the average scores are close to 50% in almost all bit locations. For example, the average sensitivity scores of all the bits in SHA-512 are between 49.79% and 50.23% as shown in Table I, which are not far from the average scores of the bits in other hash functions, like MD4 and MD5. Therefore, the average sensitivity score does not reflect which hash function is better than the others.

However, as noticed in (b) and (c) of FIG. 5 and the minimum and maximum columns in Table I, both the minimum and maximum scores clearly reflect which hash function is better than the others. SHA-512 scores are the closest to the ideal sensitivity score. Then SHA-384 comes in the second place and SHA-256 comes next. While both MD4 and MD5 scores are relatively far from the ideal score of 50%. These results suggest favoring the SHA family rather than the MD family as candidates for the implementation.

For purpose of this test, in the disclosed encryption scheme the same hash function is used in both h and ƒ hashing devices. Moreover, using a second hash function ƒ with a large output length will increase the plaintext segment length, which slightly speeds up the encryption and decryption processes and gives better overall performance. Therefore, in an exemplary aspect, SHA-512 is used for ƒ and SHA-384 is used for h in the disclosed encryption scheme.

In an objective to provide a secure and efficient solution for maintaining data confidentiality, a hash-based encryption scheme is disclosed that is designed to avoid the security issues existed in single-hash ciphers. The double-hashing design in the disclosed scheme makes it more secure than other existing hash-based ciphers. The built-in mode of operation in the disclosed scheme makes the encryption of big data a straightforward task without block size restrictions.

The disclosed scheme allows two modes of encryption. The encryption key can be handled as either symmetric or asymmetric-key without much change in the encryption scheme itself. Moreover, the disclosed scheme makes it easier to switch from symmetric to asymmetric-key and vice versa without changing the encrypted data itself. This can be achieved by just a small modification of the header of the ciphertext.

Furthermore, the disclosed scheme can be very useful in cloud data sharing with the advantage of the header of the ciphertext. Suppose some big data in the cloud is encrypted using the disclosed scheme. The user can share the data later by re-encrypting the seed and sharing the new ciphertext header without the need of encrypting the whole data or changing the secret or private key. Thus, the encrypted data stays as is in the cloud, only the seed is encrypted and shared as needed.

The disclosed scheme can be utilized in cloud applications very effectively. The header of the ciphertext makes the scheme suitable for encrypting and sharing big data on the cloud with its simple and elegant key handling mechanism.

Performance Evaluation

Table 1 shows the results obtained from comparing AES-256, Blowfish, and IDEA (used in PGP), all are algorithms known to be used in encryption algorithms used to manage fine-grained access control to files in cloud computing. The table shows the time in millisecond required by each algorithm to encrypt a block data of size 100 MB, in addition to the speed up of AES-256 compared to the other two algorithms. As shown AES has a speed up of 1.19 compared to blowfish, while a larger speedup of 3.23 compared to PGP's IDEA. The results shown in Table I are collected from https://github.com/shadowsocks/libQtShadowsocks/wiki/Comparison-of-Encryption-Methods'-Speed, incorporated herein by reference in its entirety.

TABLE 1

AES VS Blowfish VS IDEA

| Algorithm | Time(ms) |
|---|---|
| IDEA | 2066.00 |
| Blowfish-CFB | 764.00 |
| AES-256 | 639.00 |
| | Speed Up |
| AES-256 VS Blowfish | 1.195618153 |
| AES-256 VS IDEA | 3.233176839 |

Data size: 100 MB
CPU: Intel Core i7-6500U

Table 2 shows the results obtained from comparing the disclosed encryption scheme (DHOME) with AES-256. The table shows the number of bytes processed by each algorithm in one second, in addition to the speed up of AES-256 compared to the disclosed encryption scheme. The results show a 1.71 speed up for AES-256 over the disclosed scheme.

TABLE 2

AES-256 VS DHOME

| Algorithm | Processed bytes in one second |
|---|---|
| AES-256 | 90392457.51 |
| DHOME | 52773105.10 |
| | Speed Up |
| AES-256 VS DHOME | 1.712850842 |

Data Size: 128 MB
CPU: Intel Xeon X5570 2.93 GHz

The results shown in Table 1 and Table 2, indicate that AES-256 is slightly faster than the disclosed encryption scheme and Blowfish. However, both AES and Blowfish are symmetric ciphers and cannot be used alone in cloud environment to handle file sharing. On the other hand, the disclosed encryption scheme is faster than IDEA used by PGP.

Security Evaluation

Security of an encryption algorithm depends on three factors: key-size, block-size, and number of rounds. The table below shows these three factors for the algorithms in question (AES, Blowfish, IDEA, and the disclosed scheme (DHOME)). Regarding brute-force attack which targets the key, the disclosed scheme has the largest key size among the other algorithms. Regarding the differential and linear attacks, both block size and number of rounds are the main factors affecting these attacks. See Biham, Eli, and Adi Shamir. "Differential cryptanalysis of DES-like cryptosystems." *Journal of CRYPTOLOGY* 4.1 (1991): 3-72; and Matsui, Mitsuru. "Linear cryptanalysis method for DES cipher." *Workshop on the Theory and Application of Cryptographic Techniques*. Springer Berlin Heidelberg, 1993, each incorporated herein by reference in their entirety. The table shows that the disclosed scheme (DHOME) by far has the highest block size and number of rounds.

| | Max key size | Block size | Max No. of Rounds |
|---|---|---|---|
| AES | 256 | 128 | 14 |
| Blowfish | 448 | 64 | 16 |

-continued

| | Max key size | Block size | Max No. of Rounds |
|---|---|---|---|
| IDEA | 128 | 64 | 8.5 |
| DHOME | 512 | 384 | 80 |

For security issues particularly applied to DHOME, please see the Security Analysis and Sensitivity Testing sections in the DHOME paper.

Big Data and Cloud Applications

Big Data typically exists in cloud applications. See Ji, Changqing, et al. "Big data processing in cloud computing environments." *Pervasive Systems, Algorithms and Networks* (*ISPAN*), 2012 12th International Symposium on. IEEE, 2012; and Hashem, Ibrahim Abaker Targio, et al. "The rise of "big data" on cloud computing: Review and open research issues." *Information Systems* 47 (2015): 98-115, each incorporated herein by reference in their entirety. Therefore, discussing encryption algorithms for cloud application includes big data applications.

In research, it was found that PGP cryptosystem can be used to achieve access control requirements. The two known symmetric algorithms used in PGP are IDEA and CAST, both having a key size of 128 bit. See Patel, S. C., Singh, R. S., & Jaiswal, S. (2015, February). Secure and privacy enhanced authentication framework for cloud computing. In *Electronics and Communication Systems* (*ICECS*), 2015 $2^{nd}$ *International Conference on* (pp. 1631-1634). IEEE, incorporated herein by reference in its entirety.

Most observed encryption algorithm used in the market is AES with key size from 128 to 256 depending wither encryption is performed for files at rest or in transit. See https://www.dropbox.com/security; https://www.o-drive.com/features/encryption; https://www.boxcryptor.com/en/encryption; and https://wwiw.ciphercloud.com/technologies/encryption/, each incorporated herein by reference in their entirety. For example, Dropbox encrypt files in transit using at least AES-128 in TLS encrypted tunnels, and AES-256 for files encrypted at rest.

AES and PGP have complimentary features: AES is vastly faster than PGP but is not a good choice to be used alone in shared environments, while PGP was designed for open networks.

Besides its security as discussed previously, the disclosed encryption scheme can be used alone to manage encryption and file sharing, unlike AES and other block ciphers which need key-management and operation mode.

An advantage of the disclosed encryption scheme over PGP is in its performance.

Validation Tests

A DHOME implementation may be validated in a similar way to the one specified by for AES block cipher under the National Institute of Standards & Technology (NIST) Cryptographic validation program. In particular, the following tests are recommended: (1) the known answer test, (2) the multi-block message test, and (3) the Monte-Carlo test. DHOME has a much simpler design than AES with a built-in mode of operation. For AES, the AES algorithm validation-suite published by NIST (AESAVS) specifies validation testing requirements for five modes of operation, namely: the ECB (Electronic Codebook). CBC (Cipher Block Chaining), OFB (Output Feedback), CFB (Cipher Feedback) and CTR (Counter) modes for the AES algorithm [1]. For DHOME-VS, however, we only need to specify the validation testing for one mode, which is the built-in mode of operation.

Security Evaluation

DHOME is resilient against the preimage attack against SHA-512 and SHA-256 that is presented in Sasaki, Yu, Lei Wang, and Kazumaro Aoki. "Preimage Attacks on 41-Step SHA-256 and 46-Step SHA-512." (Sasaki et al.). IACR Cryptology ePrint Archive 2009 (2009); 479, incorporated herein by reference in its entirety. DHOME applies two hash functions as a source of randomness and as a defense mechanism against cryptanalysis attacks. Since DHOME requires the application of two different hash functions, the security aspect related to each one is explained separately.

Figure 6:
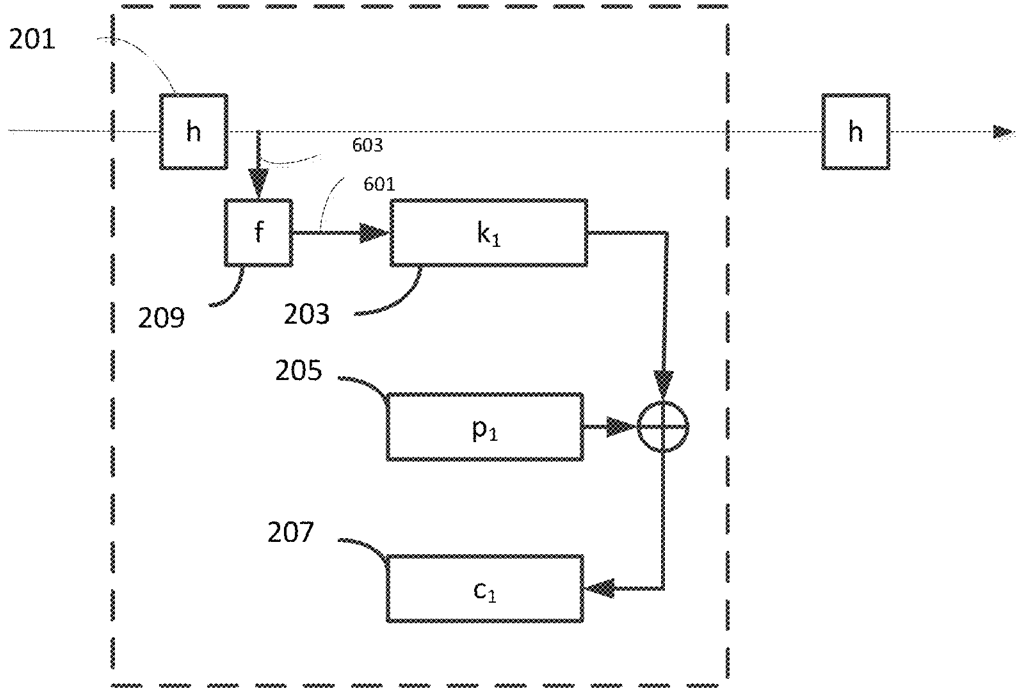
FIG. 6 is a zoom-in view from the block diagram shown in FIG. 1.

FIG. 6 is a zoom-in view from the full block diagram of DHOME shown in FIG. 2. Assuming 601 and 603 are memory registers holding temporary data. Register 601 holds the value that is generated from applying the function f on the value in register 603. The value in 601 can be retrieved by XOR-ing the ciphertext c with the plaintext p which is the same as the value of the keystream k. On the other hand, the value in 603 is the preimage value of 601 and cannot be retrieved without reversing (breaking) the hash function f (which is preferably SHA-512). So, a successful preimage attack on hash function f will expose the value in 603 which exposes all subsequent encrypted data.

Figure 7:
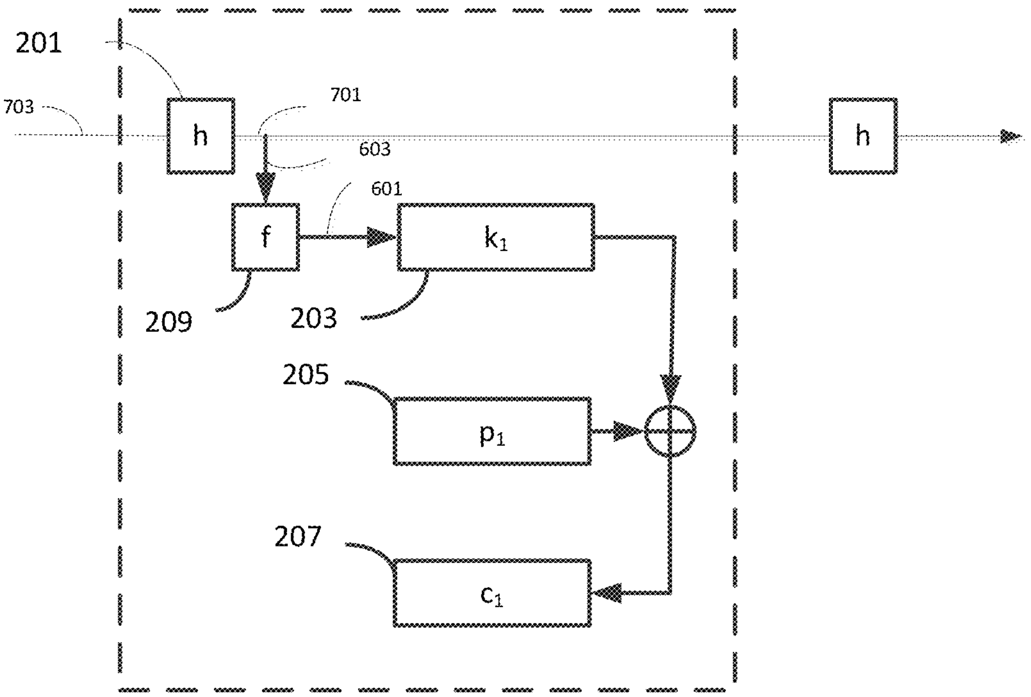
FIG. 7 is another zoom-in view from the block diagram shown in FIG. 1.

With reference to FIG. 7, the value in register 701 holds the result of applying the hash function h on the value in register 703. The value 703 can represent one of two values: either the seed, at the first step in DHOME, or the previous hash value of applying the hash function h in consecutive steps. Both values 703 and 701 cannot be calculated by the attacker without breaking the hash function f Due to the previous reason and by design, the attack in Sasaki et al. is impossible to be carried against hash function f.

The decision of which hash functions to implement is crucial to the security of DHOME especially for the hash function f. For that reason, SHA-512 is the preferred hash function f, since it is very strong in resisting preimage attacks. Even though the attack in Sasaki et al. could gain progress in attacking 46 rounds in SHA-512, it is not even close to attacking the full 80 rounds. Also, each attack only affects one encryption operation, due to the application of a random seed, the values of the keystreams (the results of the hash function f) are different in each encryption operation even for the same data and secret key.

In one implementation, each of the functions of the described embodiments may be implemented by one or more processing circuits. A processing circuit includes a programmed processor, as a processor includes circuitry. A processing circuit may also include devices such as an application specific integrated circuit (ASIC) and conventional circuit components arranged to perform the recited functions. The one or more processing circuits may be implemented in one or more processing systems, for example, a system of one or more computers 826. Next, a hardware description of the computer 826 according to exemplary embodiments is described with reference to FIG. 8.

Figure 8:
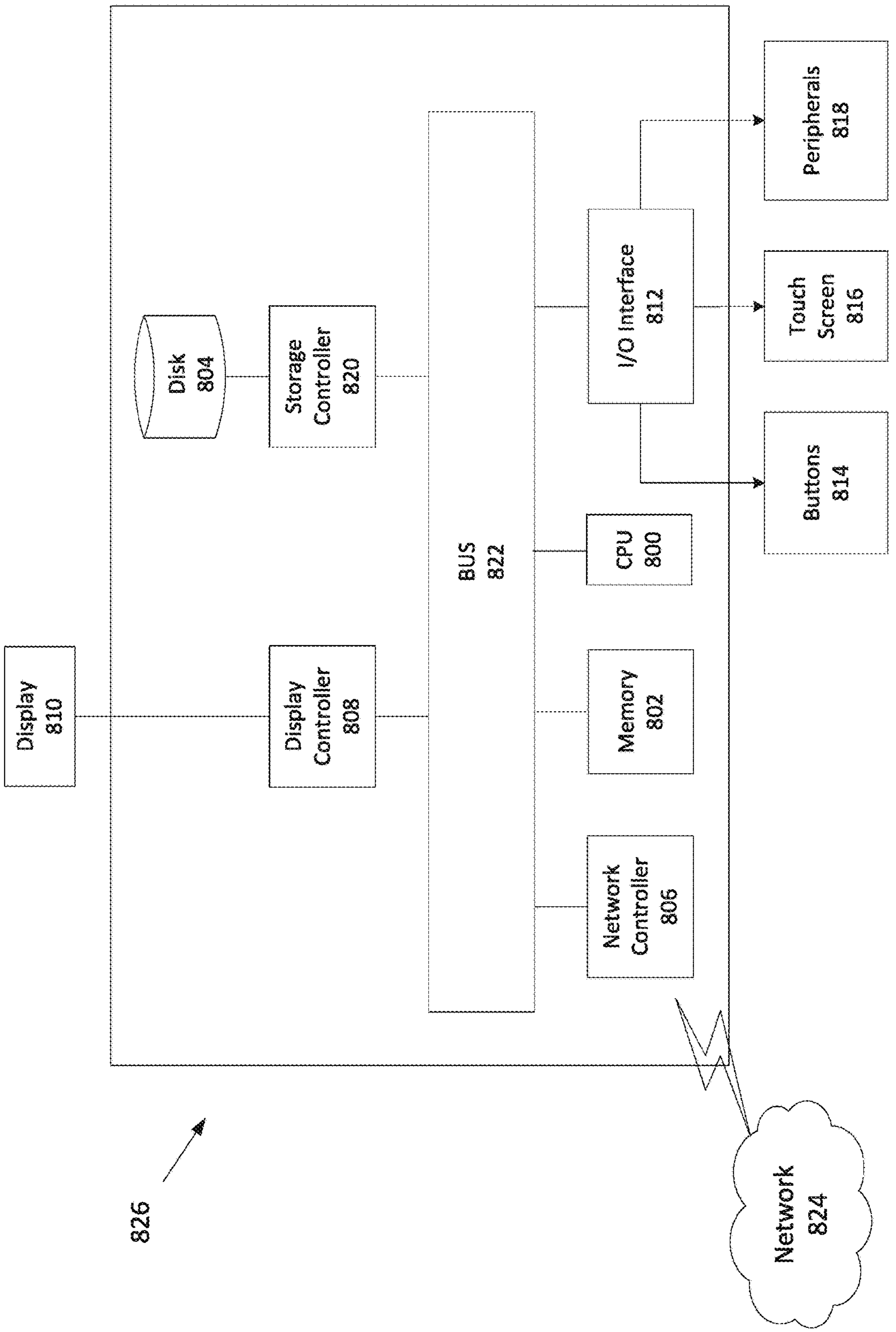
FIG. 8 illustrates a computer system according to an exemplary aspect of the disclosure.

In FIG. 8, the computer 826 includes a CPU 800 which performs the processes described herein. The process data and instructions may be stored in memory 802. These processes and instructions may also be stored on a storage medium disk 804 such as a hard drive (HDD) or portable storage medium or may be stored remotely. Further, the claimed advancements are not limited by the form of the computer-readable media on which the instructions of the inventive process are stored. For example, the instructions may be stored on CDs. DVDs, in FLASH memory, RAM. ROM, PROM. EPROM, EEPROM, hard disk or any other information processing device with which the computer 826 communicates, such as a server or computer.

Further, the claimed advancements may be provided as a utility application, background daemon, or component of an operating system, or combination thereof, executing in conjunction with CPU 800 and an operating system such as Microsoft) Windows®, UNIX®, Oracle® Solaris, LINUX®, Apple macOS® and other systems known to those skilled in the art.

In order to achieve the computer 826, the hardware elements may be realized by various circuitry elements, known to those skilled in the art. For example, CPU 800 may be a Xenon® or Core® processor from Intel Corporation of America or an Opteron® processor from AMD of America. or may be other processor types that would be recognized by one of ordinary skill in the art. Alternatively, the CPU 800 may be implemented on an FPGA. ASIC, PLD or using discrete logic circuits, as one of ordinary skill in the art would recognize. Further, CPU 800 may be implemented as multiple processors cooperatively working in parallel to perform the instructions of the inventive processes described above.

The computer 826 in FIG. 8 also includes a network controller 806, such as an Intel Ethernet PRO network interface card from Intel Corporation of America, for interfacing with network 824. As can be appreciated, the network 824 can be a public network, such as the Internet, or a private network such as LAN or WAN network, or any combination thereof and can also include PSTN or ISDN sub-networks. The network 824 can also be wired, such as an Ethernet network, or can be wireless such as a cellular network including EDGE, 3G and 4G wireless cellular systems. The wireless network can also be WiFi®, Bluetooth®, or any other wireless form of communication that is known.

The computer 826 may further include a display controller 808, such as a NVIDIA® GeForce® GTX or Quadro® graphics adaptor from NVIDIA Corporation of America for interfacing with display 810, such as a Hewlett Packard® LCD monitor. An I/O interface 812 may interface with a keyboard and/or mouse 814 as well as an optional touch screen panel 816 on or separate from display 810. I/O interface may also connect to a variety of peripherals 818 including printers and scanners, such as an OfficeJet® or DeskJet® from Hewlett Packard®.

The storage controller 820 connects the storage medium disk 804 with communication bus 822, which may be an ISA, EISA, VESA, PCI, or similar, for interconnecting all of the components of the computer 826. A description of the general features and functionality of the display 810, keyboard and/or mouse 814, as well as the display controller 808, storage controller 820, network controller 806, and I/O interface 812 is omitted herein for brevity as these features are known.

A system which includes the features in the foregoing description provides numerous advantages. In particular, the disclosed hash-based encryption scheme includes a built-in mode of operation using double hashing. The built-in mode of operation in the encryption scheme makes it capable of encrypting big data without block size restrictions. The built-in mode of operation enables direct encryption in a secure fashion. Traditional block ciphers require particular modes of operation, such as: ECB (Electronic Codebook), CBC (Cipher Block Chaining), OFB (Output Feedback), CFB (Cipher Feedback) and CTR (Counter) modes for the AES algorithm, to avoid security issues.

The disclosed encryption scheme provides scalability for secure file sharing which is required for cloud environments. General symmetric block ciphers do not provide scalability since sharing the same file with n parties (n symmetric keys) would require encrypting the entire file n times (in cloud environments n is normally very large). Traditional block ciphers apply the secret key inside the encryption process.

The encryption key in the disclosed encryption scheme can be handled as either a symmetric or an asymmetric-key without much change in the encryption scheme itself or the encrypted data. Instead, the encryption key is used to encrypt the random seed that is used as the actual encryption key. For example, if a symmetric key is used in the encryption scheme to encrypt data, the ciphertext can be later decrypted using an asymmetric decryption key. This can be achieved by just a small modification of the header of the ciphertext without changing the encrypted data itself.

Furthermore, the disclosed encryption scheme applies two consecutive hash-functions to generate key streams which makes the disclosed scheme highly secure against known plaintext attacks. The key streams are used to encrypt the data efficiently. Traditional hash ciphers apply only one hash function, such as a pseudorandom function, and other forms of permutations to increase the entropy of the generated text. Traditional hash ciphers apply the same hash function twice, but not consequentially, and each use of the hash function is to generate one 64-byte string. The resulted concatenation of the two hashes may be the output 128-byte pseudorandom number. Traditional techniques involve application of the same hash function multiple times on the same input to increase the randomness of password salts. Traditional techniques involve the application of the secret key inside the encryption process. Traditional techniques involve application of the same hash function to generate a temporary block that is later encrypted.

Numerous modifications and variations are possible in light of the above teachings. It is therefore to be understood that within the scope of the appended claims, the invention may be practiced otherwise than as specifically described herein.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

The invention claimed is:

1. A method, performed by circuitry in a computer system, of encrypting complex data into ciphertext, where the complex data includes image data and text data stored in one or more files in at least one memory device, wherein the complex data is binary data that is divided into a plurality of segments, the method comprising:

generating a random integer to obtain a seed;

encrypting the seed using a seed key and storing the encrypted seed in a header;

hashing the seed using a first hash function to obtain a pseudorandom value;

performing first hashing of the pseudorandom value using the first hash function to obtain a next pseudorandom value in a sequence of pseudorandom values respectively corresponding to the sequence of segments;

performing second hashing of the pseudorandom value using a second hash function to obtain a key for a segment of the plurality of segments;

encrypting the segment of the complex data using the key to obtain the ciphertext for the segment;

performing the first hashing of the next pseudorandom value using the first hash function to obtain a new next pseudorandom value in the sequence of pseudorandom values;

performing the second hashing of the next pseudorandom value using the second hash function to obtain a next key for a next segment of the plurality of segments;

encrypting the next segment of the complex data using the next key to obtain the ciphertext for the next segment;

repeating the steps of performing the first hashing, performing the second hashing, and the encrypting for obtaining the sequence of pseudorandom values and for each of the plurality of segments; and storing in a file in the at least one memory device the ciphertext with the header.

2. The method of claim 1, wherein the encrypting the segment of the complex data includes encrypting, by the circuitry, the segment of the complex data by applying an XOR function with the key to obtain the ciphertext for the segment.

3. The method of claim 1, wherein the seed is at least 512 bits.

4. The method of claim 1, wherein the first hash function is a cryptographic hash function that generates a hash of a different number of bits than the second hash function.

5. The method of claim 1, wherein the complex data includes signal data from sensors.

6. A non-transitory computer-readable storage medium storing instructions, wherein when the instructions are performed by circuitry in a computer system, the circuitry encrypts complex data, including image data and text data stored in at least one file in at least one memory device, wherein the complex data is binary data that is divided into a plurality of segments, the complex data being encrypted into ciphertext by steps comprising:

generating a random integer to obtain a seed;

encrypting the seed using a seed key and storing the encrypted seed in a header;

hashing the seed using a first hash function to obtain a pseudorandom value;

performing first hashing of the pseudorandom value using the first hash function to obtain a next pseudorandom value in a sequence of pseudorandom values respectively corresponding to the sequence of segments;

performing second hashing of the pseudorandom value using a second hash function to obtain a key for a segment of the plurality of segments;

encrypting the segment of the complex data using the key to obtain the ciphertext for the segment;

performing the first hashing of the next pseudorandom value using the first hash function to obtain a new next pseudorandom value in the sequence of pseudorandom values;

performing the second hashing of the next pseudorandom value using the second hash function to obtain a next key for a next segment of the plurality of segments;

encrypting the next segment of the complex data using the next key to obtain the ciphertext for the next segment;

repeating the steps of performing the first hashing, performing the second hashing, and the encrypting for obtaining the sequence of pseudorandom values and for each of the plurality of segments; and storing in a file in the at least one memory device the ciphertext with the header.

7. The computer-readable storage medium of claim 6, wherein the encrypting the segment of the complex data includes encrypting, by the circuitry, the segment of the complex data by applying an XOR function with the key to obtain the ciphertext for the segment.

8. The computer-readable storage medium of claim 6, wherein the seed is at least 512 bits.

9. The computer-readable storage medium of claim 6, wherein the seed key is a shared secret key.

10. The computer-readable storage medium of claim 6, wherein the seed key is a public key and a secret key is used for decrypting the header.

11. The computer-readable storage medium of claim 6, wherein the first hash function is a cryptographic hash function that generates a hash of a different number of bits than the second hash function.

12. The computer-readable storage medium of claim 6, wherein the complex data includes signal data from sensors.

13. A method, performed by circuitry in a computer system, of encrypting complex data into ciphertext, where the data includes image data and text data stored in at least one buffer memory device, wherein the complex data is binary data that is divided into a plurality of segments, the method comprising:

generating a random integer to obtain a seed;

encrypting the seed using a seed key and storing the encrypted seed in a header;

hashing the seed using a first hash function to obtain a pseudorandom value;

performing first hashing of the pseudorandom value using the first hash function to obtain a next pseudorandom value in a sequence of pseudorandom values respectively corresponding to the sequence of segments;

performing second hashing of the pseudorandom value using a second hash function to obtain a key for a segment of the plurality of segments;

encrypting the segment of the complex data using the key to obtain the ciphertext for the segment;

performing the first hashing of the next pseudorandom value using the first hash function to obtain a new next pseudorandom value in the sequence of pseudorandom values;

performing the second hashing of the next pseudorandom value using the second hash function to obtain a next key for a next segment of the plurality of segments;

encrypting the next segment of the complex data using the next key to obtain the ciphertext for the next segment;

repeating the steps of performing the first hashing, performing the second hashing, and the encrypting for obtaining the sequence of pseudorandom values and for each of the plurality of segments; and transmitting the ciphertext with the header.

14. The method of claim 13, wherein the encrypting the segment of the complex data includes encrypting, by the circuitry, the segment of the complex data by applying an XOR function with the key to obtain the ciphertext for the segment.

15. The method of claim 13, wherein the seed key is a shared secret key that is used for decrypting the header.

16. The method of claim 13, wherein the seed key is a public key and a secret key is used for decrypting the header.

17. The method of claim 13, wherein the complex data includes signal data from sensors.

* * * * *